US010280768B2

(12) United States Patent
Freeman et al.

(10) Patent No.: US 10,280,768 B2
(45) Date of Patent: May 7, 2019

(54) TURBINE BLISK INCLUDING CERAMIC MATRIX COMPOSITE BLADES AND METHODS OF MANUFACTURE

(71) Applicants: Rolls-Royce North American Technologies, Inc., Indianapolis, IN (US); Rolls-Royce High Temperature Composites Inc., Huntington Beach, CA (US)

(72) Inventors: Ted J. Freeman, Danville, IN (US); Todd Z. Engel, Long Beach, CA (US)

(73) Assignees: Rolls-Royce North American Technologies Inc., Indianapolis, IN (US); Rolls-Royce High Temperature Composites Inc., Cypress, CA (US)

( * ) Notice: Subject to any disclaimer, the term of this patent is extended or adjusted under 35 U.S.C. 154(b) by 613 days.

(21) Appl. No.: 14/937,260

(22) Filed: Nov. 10, 2015

(65) Prior Publication Data

US 2016/0130957 A1    May 12, 2016

Related U.S. Application Data

(60) Provisional application No. 62/078,761, filed on Nov. 12, 2014.

(51) Int. Cl.
*F01D 5/30* (2006.01)
*F01D 5/16* (2006.01)
*F01D 5/02* (2006.01)
(Continued)

(52) U.S. Cl.
CPC .......... *F01D 5/3061* (2013.01); *B23K 1/0018* (2013.01); *B23K 1/19* (2013.01);
(Continued)

(58) Field of Classification Search
CPC ........ F01D 5/30; F01D 5/3023; F01D 5/3061; F01D 5/3069; F01D 5/3084
See application file for complete search history.

(56) References Cited

U.S. PATENT DOCUMENTS 2,936,155 A * 5/1960 Howell ..................... F01D 5/22
416/134 R
2,944,326 A * 7/1960 Stadthaus .............. B21K 25/00
228/136

(Continued)

FOREIGN PATENT DOCUMENTS

DE    102009052783 A1    5/2011
GB         2050528 A    1/1981

OTHER PUBLICATIONS

Extended European Search Report, European Application No. 15194059.9-1610, dated Apr. 25, 2016, 10 pages.

*Primary Examiner* — Jason D Shanske
*Assistant Examiner* — Brian O Peters
(74) *Attorney, Agent, or Firm* — Barnes & Thornburg LLP (57) ABSTRACT

In some embodiments, an apparatus includes a disk, a coupling member and a set of blades. The coupling member has a first surface and a second surface, and defines a set of openings between the first surface and the second surface. The first surface is configured to be coupled to the outer surface of the disk. A portion of each blade from the set of blades is disposed within an opening from the set of openings when the first surface of the coupling member is coupled to the outer surface of the disk such that the blade is coupled to the disk.

18 Claims, 6 Drawing Sheets

(51) Int. Cl.

| | | |
|---|---|---|
| *F01D 5/28* | (2006.01) | |
| *B23K 1/00* | (2006.01) | |
| *F01D 5/06* | (2006.01) | |
| *B23K 1/19* | (2006.01) | |
| *B23K 20/02* | (2006.01) | |
| *B23K 20/233* | (2006.01) | |
| *B23K 101/00* | (2006.01) | |
| *B23K 103/00* | (2006.01) | |

(52) U.S. Cl.
CPC .......... *B23K 20/026* (2013.01); *B23K 20/233* (2013.01); *F01D 5/02* (2013.01); *F01D 5/066* (2013.01); *F01D 5/16* (2013.01); *F01D 5/282* (2013.01); *F01D 5/284* (2013.01); *F01D 5/303* (2013.01); *F01D 5/3023* (2013.01); *F01D 5/3069* (2013.01); *B23K 2101/001* (2018.08); *B23K 2103/52* (2018.08); *F05D 2220/32* (2013.01); *F05D 2230/237* (2013.01); *F05D 2230/60* (2013.01); *F05D 2240/24* (2013.01); *F05D 2300/10* (2013.01); *F05D 2300/6033* (2013.01); *Y02T 50/672* (2013.01)

(56) References Cited

U.S. PATENT DOCUMENTS

| | | | |
|---|---|---|---|
| 3,146,635 A | * | 9/1964 | Brose ............... F01D 5/027 415/104 |
| 3,612,718 A | * | 10/1971 | Palfreyman ............... F01D 5/22 416/135 |
| 4,152,816 A | * | 5/1979 | Ewing ................ B22F 7/062 228/104 |
| 4,270,256 A | | 6/1981 | Ewing et al. |
| 4,305,697 A | * | 12/1981 | Cohen .................. B23P 6/005 29/402.13 |
| 4,494,287 A | | 1/1985 | Cruzen et al. |
| 5,022,822 A | | 6/1991 | Sincere |
| 5,263,823 A | | 11/1993 | Cabaret et al. |
| 5,425,622 A | | 6/1995 | Murray et al. |
| 5,536,145 A | | 7/1996 | Vandendriessche et al. |
| 6,164,917 A | | 12/2000 | Frasier et al. |
| 6,224,339 B1 | * | 5/2001 | Rhodes .................. F01D 7/186 244/132 |
| 7,784,182 B2 | | 8/2010 | Carrier et al. |
| 7,832,986 B2 | | 11/2010 | Baker et al. |
| 8,123,487 B2 | | 2/2012 | Bayer et al. |
| 8,191,755 B2 | | 6/2012 | Clark |
| 8,206,117 B2 | | 6/2012 | Strangman et al. |
| 8,282,355 B2 | | 10/2012 | Blanchard et al. |
| 8,348,619 B2 | | 1/2013 | Derclaye et al. |
| 8,408,874 B2 | | 4/2013 | McCaffrey et al. |
| 2010/0150725 A1 | | 6/2010 | Krautheim |
| 2012/0003103 A1 | | 1/2012 | Tholath |
| 2013/0064667 A1 | | 3/2013 | Campbell et al. |
| 2013/0156590 A1 | | 6/2013 | Blanchard et al. |
| 2013/0243601 A1 | | 9/2013 | Floyd |

* cited by examiner

TURBINE BLISK INCLUDING CERAMIC MATRIX COMPOSITE BLADES AND METHODS OF MANUFACTURE

CROSS REFERENCE TO RELATED APPLICATIONS

This application claims priority to and the benefit of U.S. Provisional Patent Application No. 62/078,761, filed 12 Nov. 2014, the disclosure of which is now expressly incorporated herein by reference.

BACKGROUND

The embodiments described herein relate to turbine disk assemblies, and in particular, turbine disk assemblies (or blisks) that include ceramic matrix composite (CMC) blades.

Known turbine engines include an air intake portion, a compressor portion, a combustion portion, a turbine portion, and an exhaust portion. Such known turbine engines produce thrust and/or extract energy from a fluid flow by first compressing the intake air within the compressor portion. The compressor portion often includes a series of bladed disks to form a multi-stage, axial compressor. Fuel is added to the compressed air, and the mixture is combusted in the combustion portion. The resulting hot, high pressure gas is then expanded through the turbine portion to extract energy therefrom. The turbine portion often includes a series of bladed disk assemblies to form a multi-stage turbine.

Many known turbine disk assemblies include a series of turbine blades arranged circumferentially about a rotor or disk. Many known blades are constructed from a nickel alloy, and are secured to the rotor by the root of the blade. Some turbine blades include integral platforms extending circumferentially from both the high and low pressure sides of the airfoil near the root of the blade. The platforms can function as flow guides to direct the airflow along a desired flow path. In an effort to improve turbine performance, alternative materials have been used in the construction of some known turbine blades. For example, some known turbine blades are constructed from ceramic matrix composite (CMC) materials, which are lighter and can withstand higher temperatures than conventional nickel alloy blades.

Many known CMC blades, however, do not include an integral flow path platform. Thus, the disk assembly may include additional, non-integral flow paths, which can complicate the attachment and/or compromise the effectiveness of the assembly. Moreover, attachment of known CMC blades to the underlying rotor can be difficult, for example, due to the dissimilarity in the materials.

Thus, a need exists for an improved turbine blisks with CMC blades, and methods for manufacturing the same.

SUMMARY

Turbine blisks (or turbine disk assemblies) including CMC blades are described herein. In some embodiments, an apparatus includes a disk, a coupling member and a set of blades. The disk has an outer surface that is a continuous, circumferential surface. The coupling member has a first surface and a second surface, and defines a set of openings between the first surface and the second surface. The first surface is configured to be coupled to the outer surface of the disk. A portion of a blade from the set of blades is disposed within an opening from the set of openings when the first surface of the coupling member is coupled to the outer surface of the disk such that the blade is coupled to the disk.

In some embodiments, an apparatus includes a disk having an outer surface, a coupling member, and a set of blades. The coupling member defines a set of openings, and is configured to be bonded to the outer surface of the disk. The outer surface need not be continuous, and can have, for example, protrusions or other localized features to facilitate the bonding or joining of the coupling member to the disk. In some embodiments, the coupling member is bonded to the outer surface of the disk via a braze joint. A portion of a blade from the set of blades is disposed within an opening from the set of openings when the coupling member is bonded to the outer surface of the disk such that the blade is coupled to the disk.

DETAILED DESCRIPTION OF THE DRAWINGS

Figure 1:
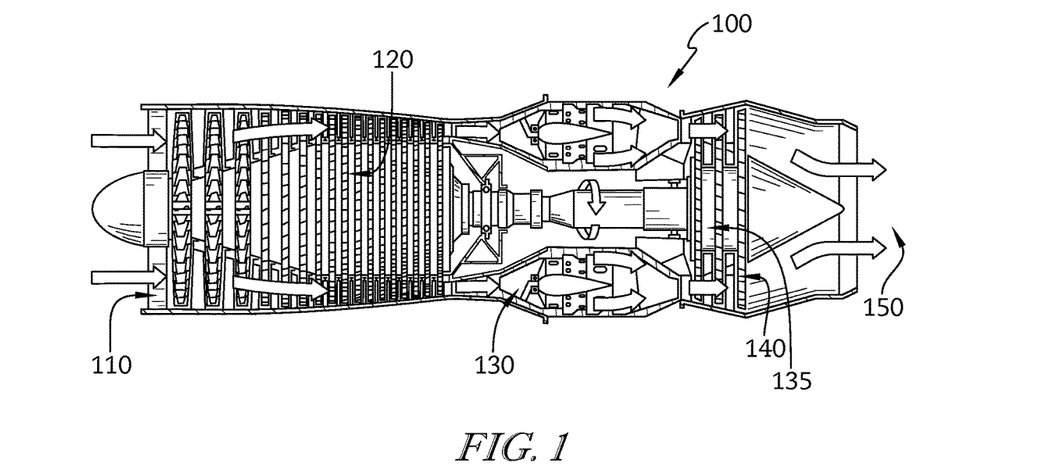
FIG. 1 is a cross-sectional view of a turbine engine and its various components.

FIG. 1 is a cross-sectional view of a turbine engine 100 according to one an embodiment of the present disclosure. The engine 100 includes an air intake portion 110, a compressor portion 120, a combustion portion 130, a turbine portion 135, and an exhaust portion 150. The engine 100 can be used in any suitable application, such as, for example, to produce thrust in aircraft applications, to drive a propeller in aquatic applications, or to drive a generator in energy applications. In use, air received from the intake portion 110 is compressed within the compressor portion 120. The compressor portion 120 includes a series of bladed disks to form a multi-stage, axial compressor. The compressed air is then mixed with fuel and the mixture is burned in combustion portion 130. The combustion portion 130 can include any suitable fuel injection and combustion mechanisms. The hot, high pressure gas is then passed through the turbine portion 135 to extract energy from the gas which in turn drives the compressor portion 120 while discharging thrust out the exhaust portion 150.

As shown, the turbine portion 135 includes a series of turbine blisks (or disk assemblies) 140. In this manner, the blisks 140 form a multi-stage turbine. In use, the gas temperatures within the turbine portion 135 can reach temperatures at or above 2000° F., 2400° F. or higher. Moreover, certain components within the turbine portion 135, such as the flow path portion of the blisks 240 can reach temperatures of between 1600 and 1900° F., and higher, due to the heat transferred from the hot gas. To accommodate these temperatures, in some embodiments, the blisks 140 can include blades that are constructed from a ceramic matrix composite (CMC) material.

Figure 2:
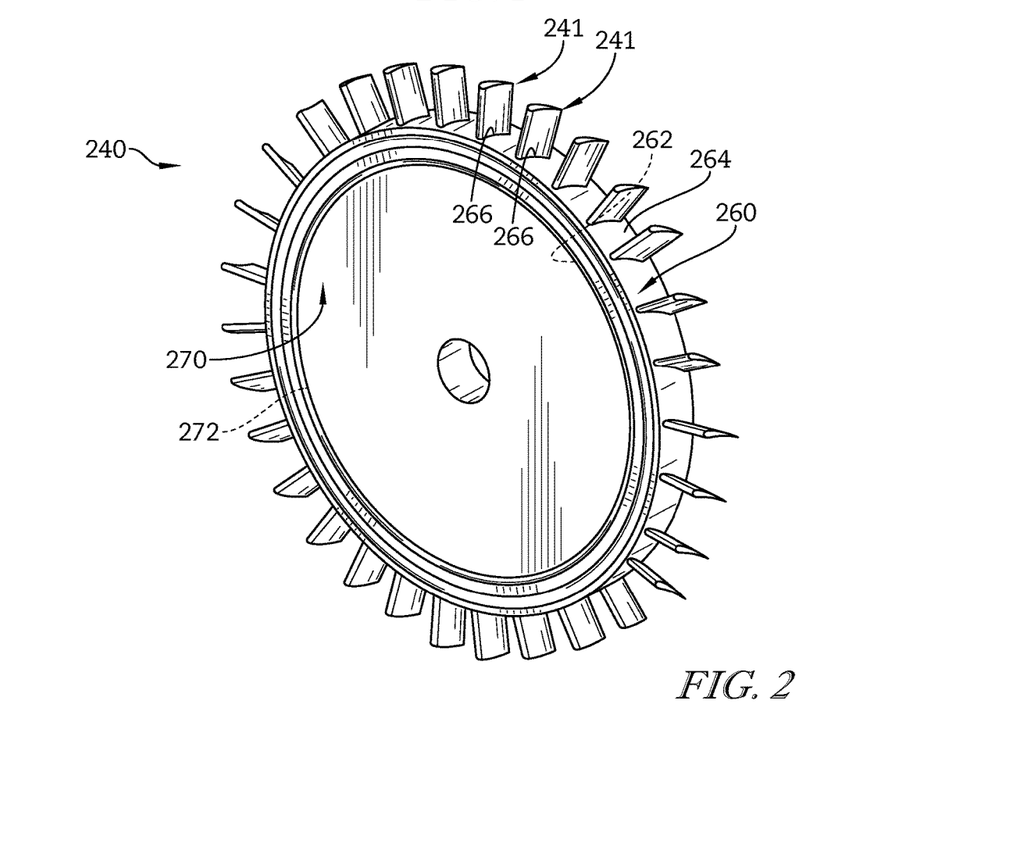
FIG. 2 is a perspective view of a bladed disk or blisk adapted for use in the turbine engine of FIG. 1.
Figure 3:
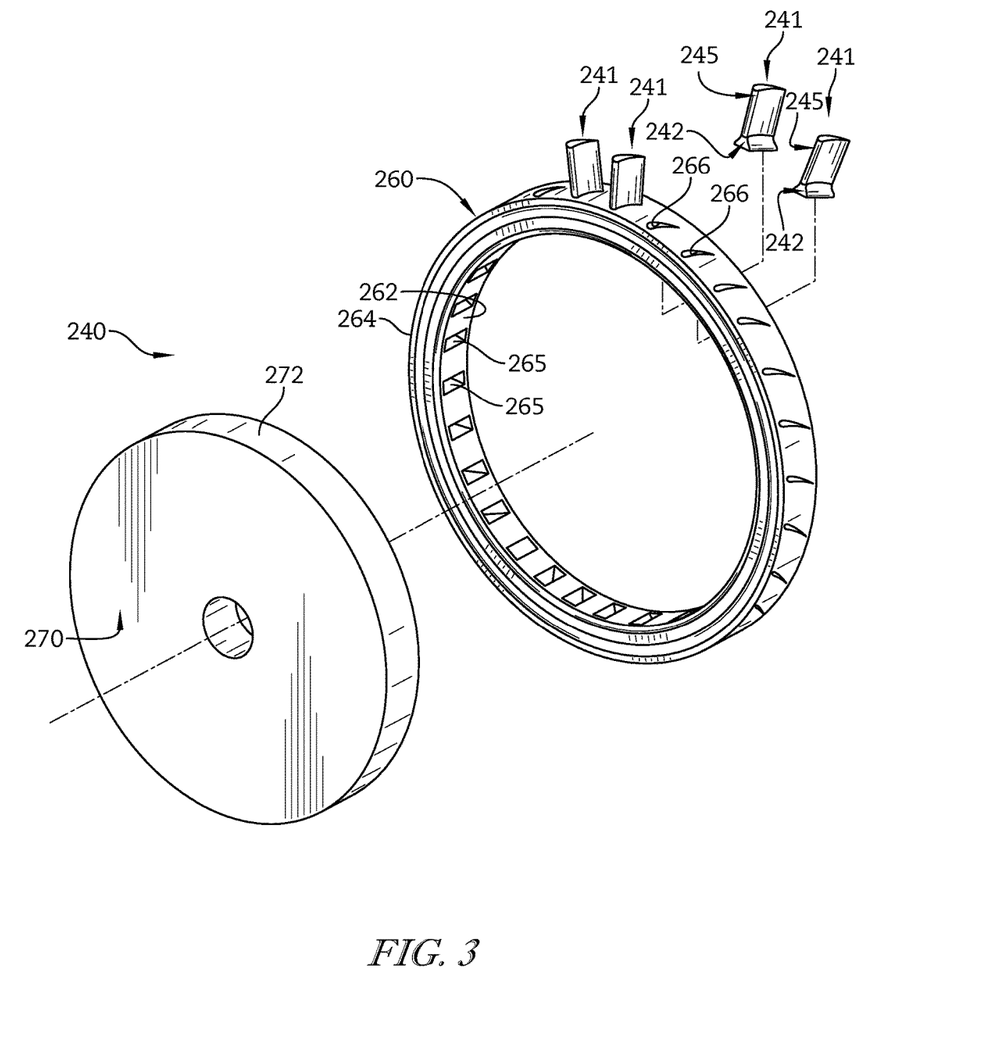
FIG. 3 is an exploded perspective assembly view of the bladed disk or blisk of FIG. 2 showing that the blisk includes a disk, a plurality of blades, and a coupling member or flow path ring sized to be mounted around an outer diameter of the disk.
Figure 4:
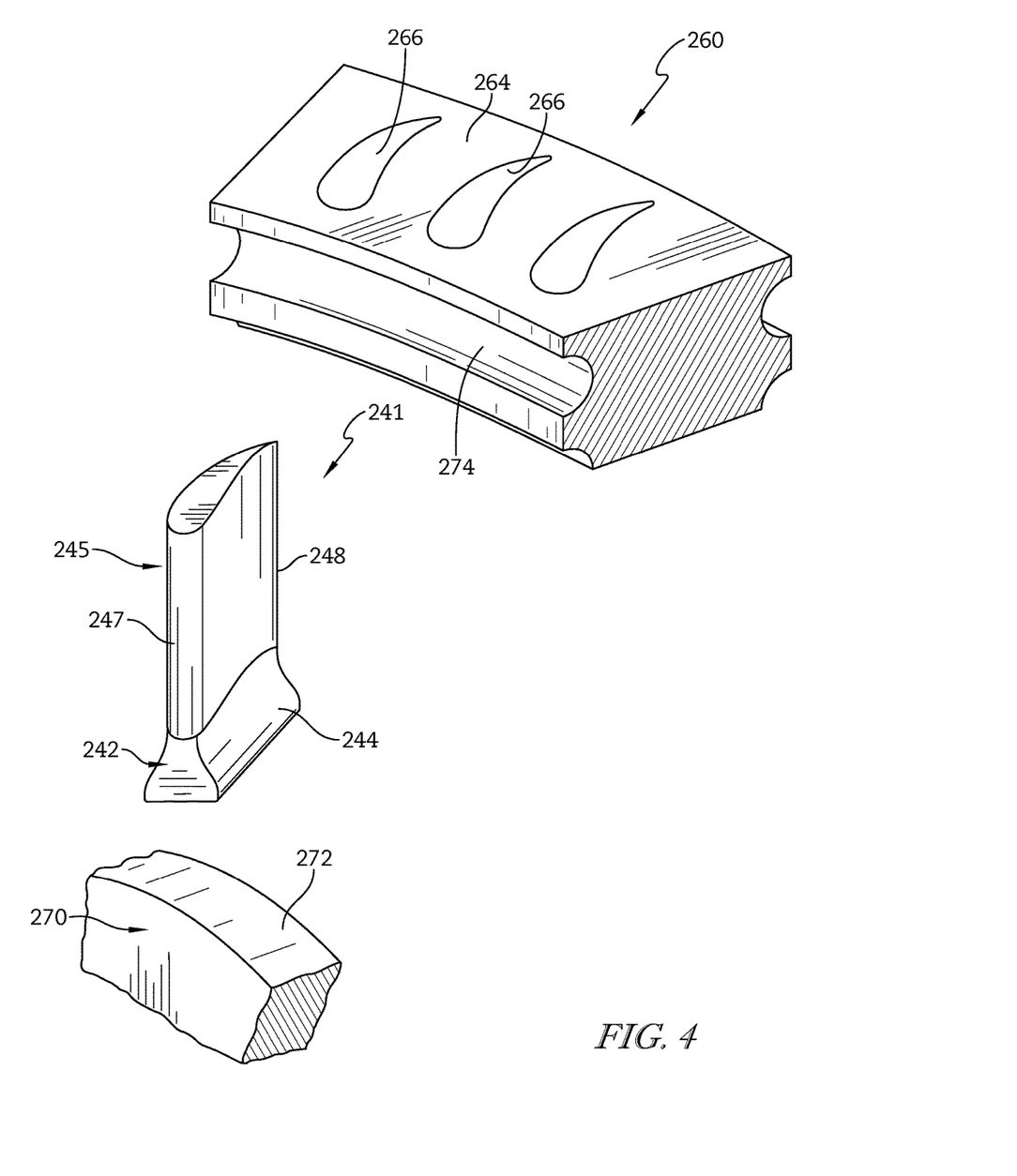
FIG. 4 is a detail view of a portion of FIG. 3 showing that the coupling member or flow path ring is formed to include openings sized to receive a root included in each blade while allowing an airfoil of each blade to extend outward from the coupling member such that the blades are trapped in place around the disk when the coupling member is mounted to the disk.
Figure 5:
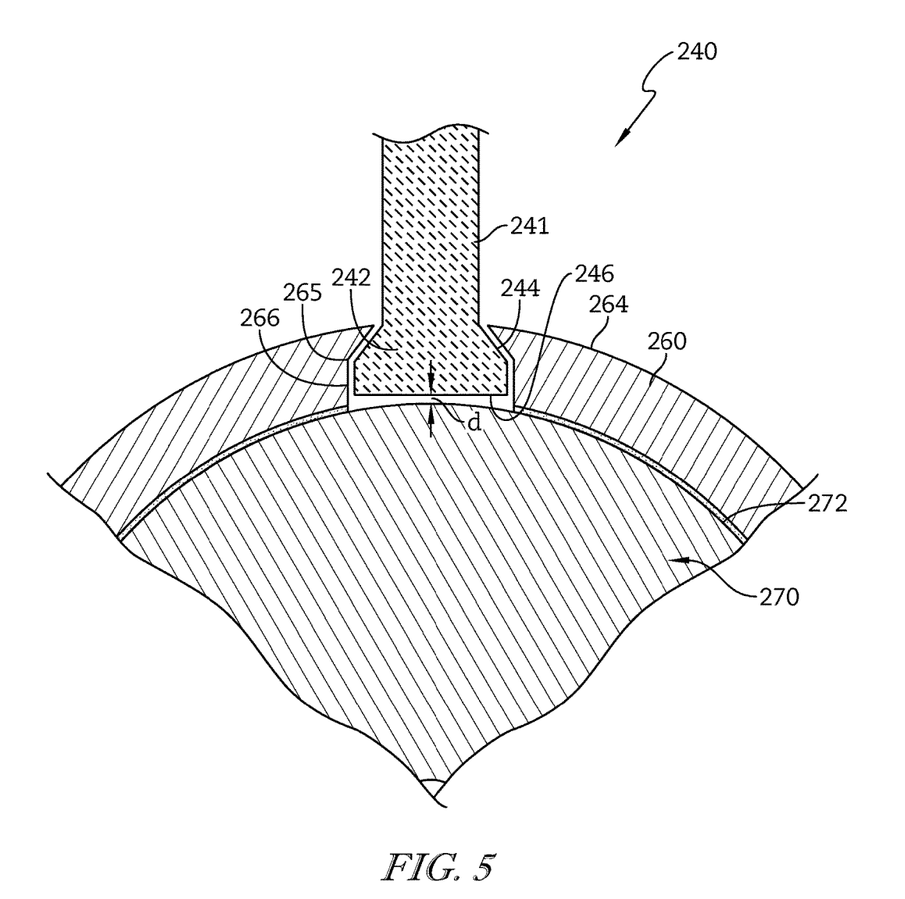
FIG. 5 is a cross-sectional schematic illustration of a turbine blisk, according to an embodiment.

FIG. 2 is an illustration of a blade and disk assembly, or blisk assembly 240, that can be used as a blisk 140 included within the engine 100 or any other suitable turbomachinery. The blisk assembly 240 includes a series of blades 241, a coupling member 260, and a disk 270. The disk 270 includes an outer surface 272 that is a continuous, circumferential surface as shown in FIGS. 3-5. The blades 241 are spaced circumferentially around the disk 270 and extend radially outward from the disk 270. The coupling member 260 is illustratively a ring formed to include openings 266 that receive roots 242 of the blades 241 while allowing airfoils 245 of the blades 241 to extend through the coupling member 260 to trap the blades 241 in place around the disk 270 as suggested in FIGS. 2-5.

According to the illustrative embodiment, the outer surface 272 of the disk 270 is devoid of discontinuities, such as, for example, grooves, slots, apertures or other "cut-outs" (e.g., within which a portion of the blade 241 can be mounted) as shown in FIGS. 3 and 4. The outer surface 272 is illustratively devoid of any posts, lugs or other protruding mounting surfaces configured to retain or secure the blades 241. In this manner, the disk 270 is configured to reduce and/or eliminate "dead load" in the outer portion. The disk 270 is illustratively configured to reduce and/or eliminate portions thereof, such as lugs or connecting protrusions, that add weight to and/or increase the diameter of the assembly without providing a corresponding amount of strength.

The coupling member 260 has a first (or inner) surface 262 and a second (or outer) surface 264, and defines a series of openings 266 that extend radially through the first surface 262 and the second surface 264 as shown in FIGS. 3-5. In particular, a side wall 265 of the openings 266 formed in the coupling member 260 defines the openings 266. As described herein, a portion of the blade 241 is disposed within the opening 266 to couple the blade 241 to the disk 270. The inner surface 262 of the coupling member 260 is configured to be coupled to the outer surface 272 of the disk 270 to couple the blades 241, the coupling member 260 and the disk 270 together to form the blisk 240.

The inner surface 262 of the coupling member 260 can be coupled to the outer surface 272 of the disk 270 in any suitable manner. For example, in some embodiments, the coupling member 260 surrounds the outer surface 272 of the disk 270, such that the coupling member 260 is disposed about the disk 270. In some embodiments, a diameter of the inner surface 262 and a diameter of the outer surface 272 of the disk 270 are sized to form an interference or "press" fit to couple (or assist in the coupling of) the coupling member 260 to the disk 270. In some embodiments, as described herein, the coupling member 260 can be brazed or bonded to the disk 270.

The coupling member 260 and/or the disk 270 (and any of the coupling members and/or disks described herein) can be fabricated from any suitable material. For example, in some embodiments, the coupling member 260 and/or the disk 270 can be constructed from a cast and/or wrought alloy. Moreover, the surfaces described herein (e.g., the inner surface 262 of the coupling member 260 and/or the outer surface 272 of the disk 270) can be constructed and/or machined to have any suitable surface properties (roughness, etc.).

The blade 241 includes a root 242 that has a coupling surface 244 and an end surface 246. As shown, a portion of the blade 241 is disposed within the opening 266 of the coupling member 260 when the coupling member 260 is coupled to the outer surface 272 of the disk 270 such that the blade 241 is coupled to the disk 270. More particularly, the root 242 of the blade is secured within the opening 266 such that the blade 241 is coupled to the disk 270 via the coupling member 260.

In some embodiments, the root 242 of the blade 241 includes a coupling surface 244 that corresponds to and/or matingly couples to a portion of the side wall 265 that defines the opening 266 as suggested in FIGS. 3 and 5. In some embodiments, for example, the coupling surface 244 and the opening 266 form a dovetail attachment. In this manner, the blade 241 can be coupled to the coupling member 260 (and therefore the disk 270) without the use of a fixed fastener, welding or brazing. In the illustrative embodiment, the blade 241 is trapped between the disk 270 and the coupling member 260 such that relative movement of the blade 241 relative to the disk 270 is blocked. This arrangement can accommodate the coupling of dissimilar materials (e.g., a CMC blade and a metallic disk) which leads to differing rates of thermal expansion.

In some embodiments, relative motion between the blade 241 and the coupling member 260 and/or disk 270 is allowed. In some such embodiments, the end surface 246 of the blade root 242 may be spaced apart from the outer surface 272 of the disk 270 and/or the inner surface 262 of the coupling member 260 by a distance d when the coupling member 260 is coupled to the disk 270. This arrangement can accommodate variations in tolerance, differing rates of thermal expansion (i.e. between the blade 241 and the disk 270) and the like. Thus, this arrangement allows relative motion between the blade 241 and the coupling member 260 and/or disk 270 while maintaining the blades 241 securely coupled to the disk 270. For example, when the blisk 240 rotates, the centrifugal load pulls the blades 241 away from the center of the disk 270. The dovetail shape coupling secures the blades 241 within the openings 266. In use, the blade may experience a centrifugal force and/or load of up to 90,000 G. In some embodiments, the distance d (or end clearance when cold and not operating) can be between about 0.002 inches and about 0.005 inches. In other embodiments, the distance d (or end clearance when cold and not operating) can be less than about 0.002 inches.

Although the blades 241 are described as being coupled within the coupling member 260 via a tapered or dovetail joint, in other embodiments, the blades 241 can be coupled within the coupling member 260 using any attachment mechanism. Such attachment mechanisms can include a spherical fitting, a pin fitting, a flat T-type fitting, and/or the like. Moreover, although the blades 241 are described as being coupled within the coupling member 260 in a manner that allows some relative motion, in other embodiments, the blades 241 can be coupled within the coupling member 260 in a manner that eliminates and/or prevents any relative motion therebetween.

The blades 241 can be constructed from any suitable material, such a ceramic matrix composite (CMC) material. In some embodiments, for example, the blade 241 can be constructed from a ceramic matrix reinforced by a refractory fiber, such as silicon carbide (SiC) fiber (e.g., a SiC—SiC CMC).

Moreover, in some embodiments, the blade 241 can be devoid of a platform or integral flow path portion. In some such embodiments, the coupling member 260 defines one or more flow paths to direct the flow of gas within the turbine portion and/or between the leading edge and trailing edge of the blades 241. Accordingly, in some embodiments, the coupling member can be referred to as a "flow path" ring.

The coupling member or flow path ring 260 can be coupled to the disk 270 to form the blisk 240 in any suitable manner. For example, in some embodiments, the coupling member 260 can be coupled to the disk 270 by a bonding or braze joint. In this manner, the disk 270 can support and/or carry at least a portion of the centrifugal load that is imparted onto the ring 260 by the blades 241 during use. More particularly, this arrangement can limit centrifugal (or "CF") loading during operation of the blisk 240. Because the blades 241 are inserted into openings 266 in the coupling member 260, which is, in some embodiments, bonded to the disk 270, no additional attachment is used to mount the blades 241. Thus, the distance between the last continuous fiber of the outer surface 272 of the disk 270 and/or the outer surface 264 of the coupling member 260 and the tips of the blades 241 (not shown) can be minimized. As a result, less material is carried by the blisk, and thus the disk 270 can be thinner and lighter. Moreover, in some embodiments, the blades 241 can be CMC blades, which further reduce the mass of the blisk 240. Because the CF force is a function of the mass, a reduction in mass will decrease the CF load.

In some embodiments, the blades 241 are inserted into the openings 266 of the coupling member 260 such that the root 242 of the blade 241 is matingly disposed against the coupling portion 244. The blades 421 and coupling member 260 can then be heated to about 300° F. In some embodiments, the disk 105 can be cooled or frozen, and in certain implementations it may be cooled to a temperature of between about −80° F. and about −100° F. In this manner, the outer diameter of the disk 270 can decrease while the inner diameter of the coupling member 260 can increase, thus allowing for assembly. The disk 270 may be cooled using any suitable mechanism, such as liquid nitrogen, carbon dioxide, and/or the like.

For example, in some embodiments, there may be a damper between the coupling member 260 and the plurality of blades 241 to minimize vibration.

In some embodiments, a braze material, such as a Boron braze (diffusion braze) or a standard "wide gap" braze material, is applied to the inner surface 262 of the coupling member 260 and/or the outer surface 272 of the disk 270. The heated coupling member 260 is then disposed about the cooled disk 270. When brought to room temperature, the coupling member 260 and disk 270 are securely fastened together to form the one piece blisk. In those embodiments in which a diffusion braze material was applied, the coupling member 260 and disk 270 can be heated to a temperature of between about 2000° F. and about 2200° F. for between about one and about five hours. During this brazing time, the boron diffuses out of the braze material, and the disk 270 and coupling member 260 are attached via the braze layer. In those embodiments, in which a "wide gap" braze process is used, the braze material can be applied in any suitable manner, such as, for example, by first applying a powder (which can be formulated to refrain from melting at the braze temperature), followed by a filler metal. The powder can be applied by spraying, by slurry introduction methods or the like. The coupling member 260 and the disk 270 can then be heated to allow the filler metal to be drawn into the gaps containing the powder, thus producing a substantially uniform material within the gaps between the two parts. In other embodiments, a diffusion bond may attach the coupling member 260 to the disk 270.

Although the blade 241 is shown and described as forming a dovetail coupling with the coupling member 260, in other embodiments, any suitable coupling mechanism can be used. Moreover, the openings defined by the coupling member 260 can be of any suitable shape. Such openings can, for example, correspond to the shape of the blade. For example, FIGS. 2-4 are perspective views of blade 241 and a coupling member 260 (or "flow path ring") according to an embodiment. As shown, the blade 241 includes a root 242 that has a coupling surface 244. The blade 241 also includes an airfoil 245 with a leading edge 247 and a trailing edge 248, and is devoid of any integral flow path segment (sometimes called a platform). The blade 241 illustratively comprises ceramic matrix composite materials but can be of metallic or other construction.

The coupling member 260 has an inner surface 262 and an outer surface 264, and defines a series of openings 266 as shown in FIGS. 2-5. As shown, the openings 266 are shaped to conform to the leading edge 247 and trailing edge 248 of the airfoil 245 included in the blade 341. The coupling member 260 also includes a connection portion 274, which can facilitate the attachment and/or bonding of the coupling member 260 to the disk 270, as described in more detail herein.

As described herein, the root 242 of the blade 241 is disposed within the corresponding opening 266 to couple the blade 241 to the disk 270. In particular, the inner surface of the coupling member 260 is configured to be coupled to the disk to couple the blades 241, the coupling member 260 and the disk together to form a blisk, as described herein.

Although the coupling members and/or flow path rings are described herein as being a single structure that surrounds the corresponding disk, in some embodiments, a coupling member can be constructed from multiple pieces that are later joined (e.g., during the brazing, attachment and/or bonding process) to form a continuous structure that couples the blades to the disk, as described herein. For example, in some embodiments, a blisk can be constructed of multiple coupling members and/or flow path segments. Such construction can allow for the assembly of blades having an integral tip shroud.

In some embodiments, a coupling member 240 can include multiple pieces that are separated along an axis substantially normal to the circumferential axis as suggested by the phantom line in FIG. 4. Such an arrangement can allow the blades to be disposed within the opening without passing the blade tip through the opening. Moreover, although the coupling members are described herein as being bonded to the underlying disk via a braze joint, in other embodiments, a coupling member (either a monolithically constructed coupling member or a coupling member constructed from multiple components) can be coupled to a disk in any suitable manner.

Figure 6:
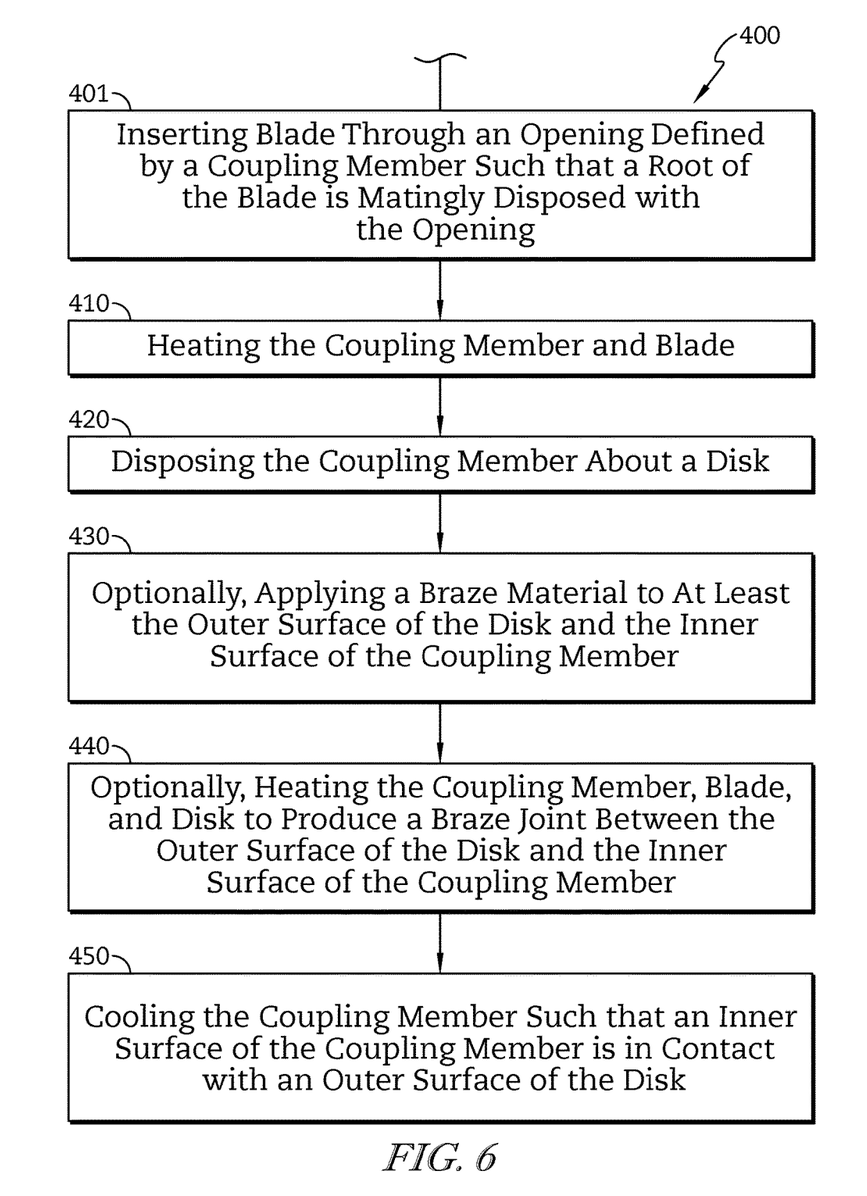
FIG. 6 is a flow chart of a method for assembling a turbine blisk, according to an embodiment.

FIG. 6 is a flow chart of a method 400 of assembling a blisk according to an embodiment. Although the method is described primarily with respect to the blisk 240, the method 400 is not limited to the assembly of the blisk 240 or any other blisks described herein. The method 400 includes inserting a blade through an opening defined by a coupling member such that a root of the blade is matingly disposed within the opening, at 401. The blade can be any of the blades described herein, such as blade 241 and the coupling member can be any suitable coupling member, such as the coupling member 260. The blade and the coupling member are then heated, at 410. The blade and the coupling member can be heated to any suitable temperature, such as, for example to about 300° F.

The coupling member (and blade) are then disposed about a disk, at 420. The disk can be any suitable disk, such as the disk 270 described herein. In some embodiments, the disk can be cooled before the coupling member is disposed about the disk, as described above.

In some embodiments, the method optionally includes applying a braze material to the outer surface of the disk and/or the inner surface of the coupling member, at 430. In such embodiments, the assembly of the coupling member, blade and disk can be heated after the coupling member is disposed about the disk, 440. In this manner, a braze joint can be formed between the outer surface of the disk and the inner surface of the coupling member.

The coupling member (and the disk) is then cooled such that an inner surface of the coupling member is in contact with an outer surface of the disk, at 450.

Figure 7:
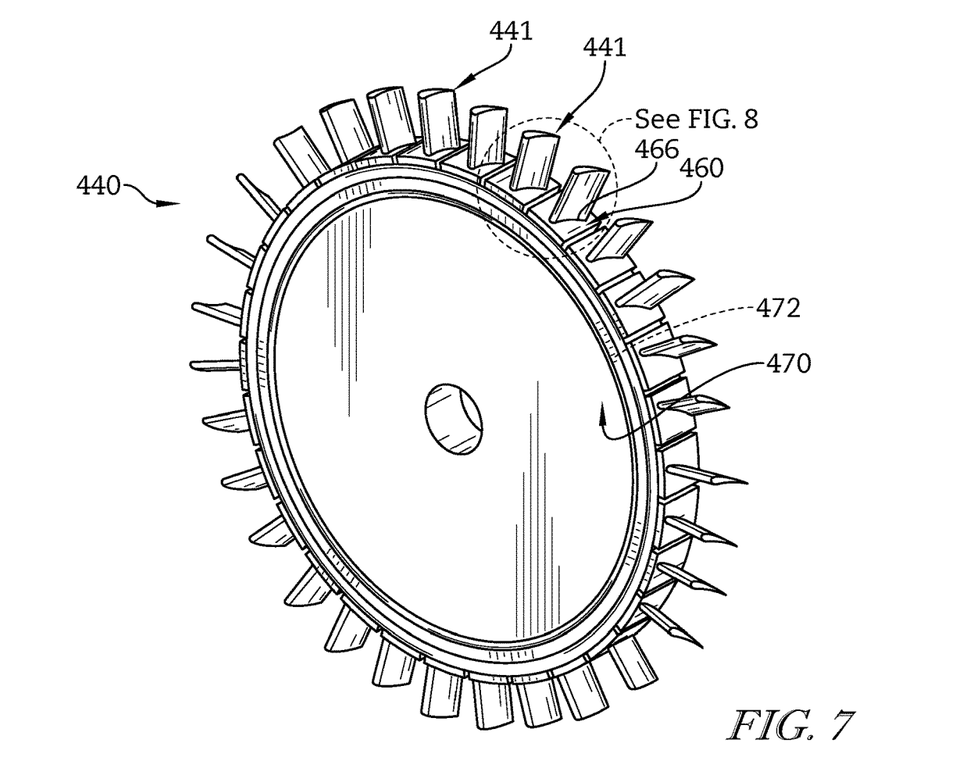
FIG. 7 is a perspective view of another turbine blisk, according to an embodiment of the present disclosure showing that relief slots are formed in the coupling member or flow path ring.
Figure 8:
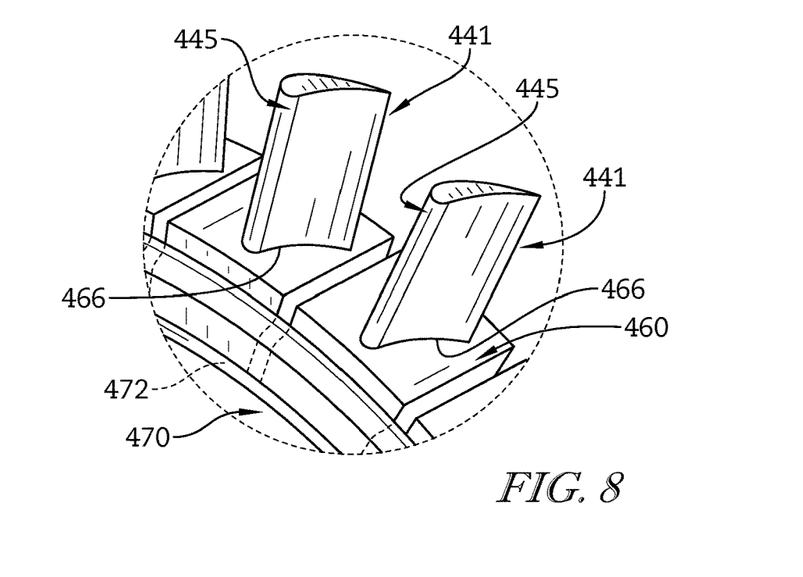
FIG. 8 is a detail view of a portion of FIG. 7 showing that the relief slots illustratively extend partway through the coupling member and suggesting that, in some embodiments, the relief slots may extend all the way through the coupling member.

Another illustrative blisk 440 is shown in FIGS. 7 and 8. The blisk 440 is configured for use in engine 100 and is substantially similar to the blisk 240 shown in FIGS. 2-6 and described herein. Accordingly, similar reference numbers in the 400 series indicate features that are common between the blisk 240 and the blisk 440. The description of the engine 100 and the blisk 240 is hereby incorporated by reference to apply to the blisk 440, except in instances when it conflicts with the specific description and drawings of the blisk 440.

Unlike blisk 240, the coupling member 460 included in the blisk 440 is formed to include relief slots 461 as shown in FIGS. 7 and 8. The relief slots 461 are illustratively arranged circumferentially between openings 466 through which blades 441 extend and are arranged to extend from an axially forward side to an axially aft side of the coupling member 460. In the illustrative embodiment, each relief slot 461 extends partway radially from an outer surface of the coupling member 460 toward the disk 470. In some embodiments, the relief slots 461 may extend in the radial direction all the way through the coupling member 460 as suggested in phantom in FIG. 8. In the illustrative embodiment, the relief slots 461 are formed by wire cuts in an optional step that may be added to the method 400.

Turbine blisks (or turbine disk assemblies) including CMC blades are described herein. In some embodiments, the assemblies described herein may be used in a turbine engine (e.g., a jet engine). In some embodiments, an apparatus includes a disk, a coupling member, and a set of blades. The disk has an outer surface that is a continuous, circumferential surface. The coupling member illustratively forms a ring around the disk and defines a set of openings formed to extend radially outward from the disk. A portion of a blade from the set of blades is disposed within one of the openings and is sized so that a root of the blade is trapped between the disk and the coupling member to couple the blade to the disk while an airfoil of the blade extends radially outward from the coupling member.

In some embodiments, an apparatus includes a disk having an outer surface, a coupling member, and a set of blades. The coupling member defines a set of openings, and is configured to be bonded to the outer surface of the disk. The outer surface need not be continuous, and can have, for example, protrusions or other localized features to facilitate the bonding or joining of the coupling member to the disk. In some embodiments, the coupling member is bonded to the outer surface of the disk via a braze joint. A portion of a blade from the set of blades is disposed within an opening from the set of openings when the coupling member is bonded to the outer surface of the disk such that the blade is coupled to the disk.

In some embodiments, a method of assembling a blisk includes inserting a blade through an opening defined by a coupling member such that a root of the blade is matingly disposed within the opening. The coupling member and the blade are heated. The coupling member is then disposed about a disk. The method further includes cooling the coupling member such that an inner surface of the coupling member is in contact with an outer surface of the disk. In some embodiments, the method optionally includes applying a braze material to the outer surface of the disk and/or the inner surface of the coupling member and heating the coupling member, blade, and disk to produce a braze joint between the outer surface of the disk and the inner surface of the coupling member.

In some embodiments, the outer diameter of the disk can be fabricated (e.g., machined) to form an interference fit with the inner diameter of the coupling member, such that the coupling member fixedly encircles or surrounds the disk. In some embodiments, the coupling member and/or the disk can be fabricated from a cast and/or wrought alloy. In some implementations, the coupling member defines one or more flow paths, and may be referred to as a "flow path ring."

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially. While the embodiments have been particularly shown and described, it will be understood that various changes in form and details may be made.

Although the blisks have been described herein as being turbine blisks, in other embodiments any of the structures and methods described herein can be used in conjunction with a compressor wheel or disk assembly.

As used herein, the terms "about" and "approximately" generally mean plus or minus 10% of the value stated. For example, about 0.5 would include 0.45 and 0.55, about 10 would include 9 to 11, about 1000 would include 900 to 1100. Such variances can result from manufacturing tolerances, measurement tolerances, tolerance stacking, and/or other practical considerations (such as, for example, a force exerted on and/or otherwise experienced by a structure). For example, a variance may result from a manufacturing tolerance associated with a given manufacturing process. In such instances, particularly when dealing with very small measurements and/or values (e.g., fractions of an inch), manufacturing tolerances may be plus or minus less than 1%, 2%, 3%, 4%, 5%, 6%, 7%, 8%, 9%, 10%, or more of the stated value.

The following numbered clauses include embodiments that are contemplated and non-limiting:

Clause 1. A turbine disk assembly adapted for use in a gas turbine engine, the assembly comprising a disk comprising metallic materials and forming an outer surface, the outer surface being a continuous circumferential surface that extends around a central axis that defines an axial direction parallel thereto and a radial direction perpendicular thereto, a blade comprising ceramic matrix composite materials, the blade including a root arranged radially outward of the outer surface formed by the disk and an airfoil extending radially outward from the root, and a ring coupled to the disk and extending around the outer surface formed by the disk, the ring formed to include an opening that receives at least a portion of the root included in the blade to couple the blade to the ring while at least a portion of the airfoil included in the blade is arranged outside of the opening radially outward of the ring to interact with gasses radially outward of the ring.

Clause 2. The assembly of any suitable clause, wherein a diameter of the outer surface formed by the disk is greater than a radially-inner surface of the ring when the disk and the ring are at the same temperature so that the disk and the ring are interference fit with one another.

Clause 3. The assembly of v, wherein the ring is bonded to the disk via a braze joint arranged between the radially-inner surface of the ring and the outer surface formed by the disk.

Clause 4. The assembly of any suitable clause, wherein the root of the blade is not bonded to the disk.

Clause 5. The assembly of any suitable clause, wherein the ring is bonded to the disk via a braze joint arranged between the radially-inner surface of the ring and the outer surface formed by the disk; and the root of the blade is not bonded to the disk.

Clause 6. The assembly of any suitable clause, wherein the opening formed in the ring extends radially through the ring from a radially-inner surface of the ring to a radially-outer surface of the ring.

Clause 7. The assembly of any suitable clause, wherein the root of the blade forms one of a dovetail shape, a tapered shape, and a generally cylindrical shape; and the opening formed in the ring forms a negative shape corresponding to at least a portion of the root.

Clause 8. The assembly of any suitable clause, wherein the ring forms a one-piece full hoop extending around the central axis.

Clause 9. The assembly of any suitable clause, wherein the opening is spaced apart from an axially-forward side and an axially-aft side of the ring.

Clause 10. The assembly of any suitable clause, wherein the radially-outer surface of the ring provides a flow path defining surface.

Clause 11. A turbine disk assembly adapted for use in a gas turbine engine, the assembly comprising a disk having an outer surface, the outer surface being a continuous circumferential surface;

a coupling member having a first surface and a second surface, and defining a plurality of openings between the first surface and the second surface, the first surface configured to be coupled to the outer surface of the disk; and a plurality of blades, a portion of a blade from the plurality of blades being disposed within an opening from the plurality of openings when the first surface of the coupling member is coupled to the outer surface of the disk such that the blade is coupled to the disk.

Clause 12. The assembly of any suitable clause, wherein the second surface of the coupling member defines a flow path.

Clause 13. The assembly of any suitable clause, wherein the blade from the plurality of blades is devoid of a platform.

Clause 14. The assembly of any suitable clause, wherein the first surface of the coupling member is bonded to the outer surface of the disk.

Clause 15. The assembly of any suitable clause, wherein the portion of the blade is a root of the blade, the root having an end surface that is spaced radially apart from the outer surface of the disk when the first surface of the coupling member is coupled to the outer surface of the disk.

Clause 16. The assembly of any suitable clause, wherein the blade from the plurality of blades is constructed from a ceramic matrix composite material.

Clause 17. The assembly of any suitable clause, further comprising a damper between the coupling member and the plurality of blades, wherein the damper is configured to dampen vibration.

Clause 18. A method of constructing a turbine disk assembly adapted for use in a gas turbine engine, the method comprising inserting a blade through an opening defined by a coupling member such that a root of the blade is matingly disposed within the opening;

heating the coupling member, cooling a disk, disposing the coupling member about the disk, and equalizing the temperature of the disk and the coupling member such that an inner surface of the coupling member is in contact with an outer surface of the disk turbine.

Clause 19. The method of any suitable clause, further comprising applying a braze material to at least one of the outer surface of the disk and the inner surface of the coupling member; and heating the coupling member, blade, and disk to produce a braze joint between the outer surface of the disk and the inner surface of the coupling member.

Clause 20. The method of any suitable clause, wherein the ring forms a one-piece full hoop extending around the central axis and the opening is spaced apart from an axially-forward side and an axially-aft side of the coupling member.

Although various embodiments have been described as having particular features and/or combinations of components, other embodiments are possible having a combination of any features and/or components from any of embodiments where appropriate.

What is claimed is:

1. A turbine disk assembly adapted for use in a gas turbine engine, the assembly comprising a disk comprising metallic materials and forming a radially-outermost surface, the radially-outermost surface being a continuous circumferential surface that extends around a central axis that defines an axial direction parallel thereto and a radial direction perpendicular thereto, a blade comprising ceramic matrix composite materials, the blade including a root with a radially-innermost surface arranged radially outward of the radially-outermost surface formed by the disk and an airfoil extending radially outward from the root, and a ring coupled to the disk and extending around the radially-outermost surface formed by the disk, the ring formed to include an opening that receives at least a portion of the root included in the blade to couple the blade to the ring while at least a portion of the airfoil included in the blade is arranged outside of the opening radially outward of the ring to interact with gasses radially outward of the ring, wherein the opening and the at least a portion of the root received by the opening are sized to allow for relative motion between the blade and at least one of the ring and the disk so that differing rates of thermal expansion between the blade and the disk can be accounted for.

2. The assembly of claim 1, wherein the ring is bonded to the disk via a braze joint arranged between the radially-inner surface of the ring and the radially-outermost surface formed by the disk; and the root of the blade is not bonded to the disk.

3. The assembly of claim 1, wherein the opening formed in the ring extends radially through the ring from a radially-inner surface of the ring to a radially-outer surface of the ring.

4. The assembly of claim 3, wherein the ring forms a one-piece full hoop extending around the central axis.

5. The assembly of claim 4, wherein the opening is spaced apart from an axially-forward side and an axially-aft side of the ring.

6. The assembly of claim 4, wherein the radially-outer surface of the ring provides a flow path defining surface.

7. A turbine disk assembly adapted for use in a gas turbine engine, the assembly comprising
a disk comprising metallic materials and forming an outer surface, the outer surface being a continuous circumferential surface that extends around a central axis that defines an axial direction parallel thereto and a radial direction perpendicular thereto,
a blade comprising ceramic matrix composite materials, the blade including a root arranged radially outward of the outer surface formed by the disk and an airfoil extending radially outward from the root, and
a ring coupled to the disk and extending around the outer surface formed by the disk, the ring formed to include an opening that receives at least a portion of the root included in the blade to couple the blade to the ring while at least a portion of the airfoil included in the blade is arranged outside of the opening radially outward of the ring to interact with gasses radially outward of the ring,
wherein a diameter of the outer surface formed by the disk is greater than a radially-inner surface of the ring when the disk and the ring are at the same temperature so that the disk and the ring are interference fit with one another and wherein an end surface of the root is spaced apart from at least one of the outer surface formed by the disk and the inner surface of the ring by a distance d and wherein the distance d is a distance greater than zero.

8. The assembly of claim 7, wherein the ring is bonded to the disk via a braze joint arranged between the radially-inner surface of the ring and the outer surface formed by the disk.

9. The assembly of claim 8, wherein the root of the blade is not bonded to the disk.

10. A turbine disk assembly adapted for use in a gas turbine engine, the assembly comprising
a disk comprising metallic materials and forming an outer surface, the outer surface being a continuous circumferential surface that extends around a central axis that defines an axial direction parallel thereto and a radial direction perpendicular thereto,
a blade comprising ceramic matrix composite materials, the blade including a root arranged radially outward of the outer surface formed by the disk and an airfoil extending radially outward from the root, and
a ring coupled to the disk and extending around the outer surface formed by the disk, the ring formed to include an opening that receives at least a portion of the root included in the blade to couple the blade to the ring while at least a portion of the airfoil included in the blade is arranged outside of the opening radially outward of the ring to interact with gasses radially outward of the ring,
wherein the opening formed in the ring extends radially through the ring from a radially-inner surface of the ring to a radially-outer surface of the ring,
wherein the root of the blade forms a dovetail shape or tapered outward shape and the opening formed in the ring forms a negative shape corresponding to at least a portion of the root, and
wherein the opening and the at least a portion of the root received by the opening are sized to allow for relative motion between the blade and the ring so that differing rates of thermal expansion between the blade and the disk can be accounted for.

11. A turbine disk assembly adapted for use in a gas turbine engine, the assembly comprising
a disk having an outer surface, the outer surface being a continuous circumferential surface;
a coupling member having a first surface and a second surface, and defining a plurality of openings between the first surface and the second surface, the first surface configured to be coupled to the outer surface of the disk; and
a plurality of blades, a portion of a blade from the plurality of blades being disposed within an opening from the plurality of openings when the first surface of the coupling member is coupled to the outer surface of the disk such that the blade is coupled to the disk,
wherein the portion of the blade is a root of the blade, the root having a radially-innermost end surface that is spaced radially apart from the radially-outermost surface of the disk when the first surface of the coupling member is coupled to the outer surface of the disk and wherein relative motion between the blade and one of the ring and the disk is allowed.

12. The assembly of claim 11, wherein the second surface of the coupling member defines a flow path.

13. The assembly of claim 11, wherein the blade from the plurality of blades is devoid of a platform.

14. The assembly of claim 11, wherein the first surface of the coupling member is bonded to the outer surface of the disk.

15. The assembly of claim 11, wherein the blade from the plurality of blades is constructed from a ceramic matrix composite material.

16. A method of constructing a turbine disk assembly adapted for use in a gas turbine engine, the method comprising
inserting a blade through an opening defined by a ring such that a root of the blade is matingly disposed within the opening,
heating the ring,
cooling a disk,
disposing the ring about the disk, and
equalizing the temperature of the disk and the ring such that an inner surface of the ring is interference fit with an outer surface of the disk and relative motion between the blade and one of the ring and the disk is allowed.

17. The method of claim 16, further comprising
applying a braze material to at least one of the outer surface of the disk and the inner surface of the ring; and heating the ring, blade, and disk to produce a braze joint between the outer surface of the disk and the inner surface of the ring.

18. The method of claim 16, wherein the ring forms a one-piece full hoop extending around a central axis and the opening is spaced apart from an axially-forward side and an axially-aft side of the ring.

* * * * *